United States Patent
Buchanan (10) Patent No.: US 10,389,540 B2
(45) Date of Patent: Aug. 20, 2019

(54) POWER OVER ETHERNET DEVICES

(71) Applicant: Extremely Low Energy Limited, Liverpool (GB)

(72) Inventor: Mark Buchanan, Liverpool (GB)

(73) Assignee: Extremely Low Energy Limited, Liverpool (GB)

( * ) Notice: Subject to any disclaimer, the term of this patent is extended or adjusted under 35 U.S.C. 154(b) by 305 days.

(21) Appl. No.: 15/519,682

(22) PCT Filed: Oct. 19, 2015

(86) PCT No.: PCT/GB2015/053096
§ 371 (c)(1),
(2) Date: Apr. 17, 2017

(87) PCT Pub. No.: WO2016/059435
PCT Pub. Date: Apr. 21, 2016

(65) Prior Publication Data
US 2017/0250828 A1    Aug. 31, 2017

(30) Foreign Application Priority Data

Oct. 17, 2014  (GB) .................................. 1418446.9

(51) Int. Cl.
*H02J 3/02*   (2006.01)
*H04L 12/10*  (2006.01)
*H04L 12/40*  (2006.01)

(52) U.S. Cl.
CPC ............... *H04L 12/10* (2013.01); *H02J 3/02* (2013.01); *H04L 12/40045* (2013.01)

(58) Field of Classification Search
None
See application file for complete search history.

(56) References Cited

U.S. PATENT DOCUMENTS

| | | | |
|---|---|---|---|
| 2005/0197094 A1* | 9/2005 | Darshan | H04L 12/10 455/402 |
| 2006/0100799 A1* | 5/2006 | Karam | G06F 1/26 702/57 |
| 2007/0177411 A1* | 8/2007 | Picard | H04L 12/10 363/35 |
| 2007/0284946 A1 | 12/2007 | Robbins | |
| 2011/0241425 A1 | 10/2011 | Hunter, Jr. et al. | |

FOREIGN PATENT DOCUMENTS

| | | |
|---|---|---|
| CN | 202838910 U | 3/2013 |
| GB | 2462312 A | 2/2010 |

* cited by examiner

*Primary Examiner* — Jared Fureman
*Assistant Examiner* — Aqeel H Bukhari
(74) *Attorney, Agent, or Firm* — Coats & Bennett, PLLC (57) ABSTRACT

A Power over Ethernet, PoE, connector device (100) comprises a first connector (112) for, in use, connecting a first set comprising at least one power wire pair (110A, 110D) of a PoE cable (102) to a first powered device (116). The PoE connector device further comprises a second connector (114) for, in use, connecting a second set comprising at least one other power wire pair (110B, 110C) of the PoE cable to at least one further powered device (118). Embodiments also provide a display device and a computing system.

15 Claims, 4 Drawing Sheets

POWER OVER ETHERNET DEVICES

FIELD OF THE INVENTION

The present invention relates to Power over Ethernet (PoE) and to related methods and devices.

BACKGROUND TO THE INVENTION

Power over Ethernet (PoE) is a known technology that allows network cables to carry electrical power. Thus, PoE-enabled devices can receive power as well as data through the twisted pairs of an Ethernet cable. PoE can provide many advantages for installations, including reducing time and expense of installing electrical power cables. PoE-enabled devices do not require mains AC electrical outlets to operate and PoE systems can also protect equipment from overload.

The 802.3 PoE standard defines two types of PoE implementation:
  Mode A—power is sent together with the data on twisted pairs 1/2 & 3/6 of the Ethernet cable
  Mode B—data is sent on pairs 1/2 & 3/6, and power is sent on pairs 4/5 and 7/8 of the Ethernet cable as pairs 4/5 and 7/8 are unused in Fast Ethernet networks. In the case of Gigabit and 10G Ethernet all 4 pairs are used for both data and power transmission so an alternative mode implements a simplex, or 'phantom' power method for delivering power to the end device and power is carried on the same conductors as data.

CAT-5 cabling for standard 10 BaseT and 100 Base-TX Ethernet uses two data/signal pairs connected to pins 1 and 2 and pins 3 and 6 on RJ-45 connectors. Power sourcing equipment injects power onto these pins via the centre tap of internal signal coupling transformers. In the powered device the power is derived from these lines using a reverse technique. There are powered devices that can operate in Gigabit Ethernet networks. These use transformers that enable transmission of power along with the data (as in mode A of 802.3). An alternative mode B carries power over spare wire pairs in the cable. The power sourcing equipment applies positive voltage to pins 4 and 5. Negative voltage is applied to pins 7 and 8.

Conventionally, one device is powered using one PoE cable. Also, the amount of power that can be transferred using PoE is limited (typically around 13-25 W). There is therefore a strong drive in the electronics industry to develop ways of transferring greater power using PoE in order to accommodate high-energy devices, and therefore broaden the types of devices that can be used with PoE, which have typically been restricted to IP Phones and fixed IP CCTV cameras. However, the use of a standard Ethernet-cabling infrastructure for a single port delivering greater than 100 W is not safe under the current US National Electric Code standard and increasing loads could result in overheating causing melted wires and potential fires.

It is an aim of example embodiments of the present invention to address at least one disadvantage of the prior art, whether identified herein or otherwise.

SUMMARY OF THE INVENTION

In a first aspect, the present invention provides a Power over Ethernet (PoE) connector device comprising:
  a first connector for, in use, connecting a first set comprising at least one power wire pair of a Power over Ethernet (PoE) cable to a first powered device, and
  a second connector for, in use, connecting a second set comprising at least one other power wire pair of the PoE cable to at least one further powered device.

The connector device may be included in a display device. The first connector (comprising an internal power supply component of the display device) may be arranged to use the at least one power wire pair to power the display device. The second connector (comprising an external power supply component of the display device) may be arranged to use the at least one other power wire pair to, in use, supply power to at least one further powered device.

In another aspect, the present invention provides a display device comprising:
  an internal power supply component arranged to use at least one power wire pair of a Power over Ethernet (PoE) cable to power the display device, and
  an external power supply component arranged to use at least one other power wire pair of the PoE cable to, in use, supply power to at least one further powered device.

The display device may comprise an LED screen.

Said further powered device may comprise a computing device, e.g. a desktop computer with a low power requirement.

The PoE connector device may be built into a socket, e.g. a wall-mounted socket.

The PoE connector device may further include at least one DC power outlet, e.g. a DC jack plug or any proprietary power connector instead of a DC jack plug, such a JST connector. Alternatively or additionally, the PoE connector device can include one or more USB connector. The at least one DC power outlets can have a fixed DC voltage output. The PoE connector device may include a switched output to vary voltage output by the first connector, the second connector and/or the at least one DC power outlet. The PoE connector device may auto-detect a required voltage of a connected device(s).

The PoE connector device may include a switch to switch the at least one DC power outlet on/off, and to switch the first connector and the second connector off/on.

The PoE connector device may include an internal power supply and/or may be connected to an external power source. Embodiments may be powered by Ethernet cables, e.g. 16 power cores (2×8 pairs of cables). Embodiments of the PoE connector device may include in-built battery storage to be trickle charged via PoE to deliver higher power for shorter intervals via the DC outlets, or to provide a startup current for devices with a high startup threshold but lower operating values.

The PoE connector device may include a warning device, e.g. light, audio alarm and/or display, to show when a power level of at least one said connected devices is approaching an upper power limit. The PoE connector device may be configured to cut out when the upper power limit has, in use, been reached across all or some of the first connector, the second connector and/or the at least one DC power outlet.

The connector device may include a power use display configured to show, in use, power being used by at least one device connected to the first connector, the second connector and/or the at least one DC power outlet. The power use display may be further configured to show, in use, information relating to a carbon footprint, total energy used and/or battery/storage charge of at least one device connected to the first connector, the second connector and/or the at least one DC power outlet.

Embodiments of the connector device can incorporate at least one DC to AC inverter and at least one corresponding AC power outlet. Such embodiments may obtain power from a plurality of paired cores via a plurality of Ethernet cables, and/or may charge an energy store in the connector device via a plurality of paired cores at unused/low usage periods.

The PoE cable will typically comprise more than two power wire pairs, for example, four power wire pairs. In some embodiments the internal power supply component may use two power wire pairs of the PoE cable and the external power supply component may use two other power wire pairs of the PoE cable that can utilise PoE mode A and mode B simultaneously. Instead of delivering all power to one high power device via a four-pair solution, the same four-pair configuration can be used to power two-pair power to a plurality of powered devices, e.g. two energy efficient devices using a total of <30 W of power. The balancing of the transmitted power along with reduced power dissipation and energy can translate into further cost savings A combined power requirement of the first powered device/display device and at the at least one further powered device may not exceed 1 W-25.5 W per 2 pairs/PoE mode. The at least one further powered device may be electrically isolated from the first powered device/display device. Thus, if the first powered device/display device or any of the powered devices spike or exceed their allocated power allowance then only that device will normally be affected.

The internal (or external) power supply component may use alternative mode A PoE power transfer method and the external (or internal) power supply component may simultaneously use alternative mode B PoE power transfer method. Embodiments of the present invention can be IEEE802.3af and at-2009 compliant as these standards do not specify that 1 PDU/PSE (Power Sourcing Equipment) port cannot be connected with one powered device over the 2-pairs using conductors 1, 2, 36 and the other powered device using the 2-pairs that use conductors 4, 5, 7, 8 from the same PDU/PSE port. This can be done using either a compliant ACTIVE or, for a non-compliant solution, using a forced power PASSIVE version of Power Sourcing Equipment.

The internal power supply component may include a first DC to DC converter and the external power supply component may include a second DC to DC converter. The first and the second DC to DC converter may each be configurable to provide selectable and differing power levels. For example, the second DC to DC converter may be configurable to provide a power level suitable for a said further powered device. The first and the second DC to DC converters may also dynamically assign appropriate voltage levels to power the further powered devices plugged into DC terminal ports of the converters.

The connector device/display apparatus may be connected to a PoE Power Distribution Unit (PDU)/Power Sourcing Equipment (PSE). The PDU/PSE (or the second connector/external power supply component) can be configured to detect a valid said further powered device connected to the external power supply component by applying a DC voltage between transmit and receive said power wire pairs connected to the further powered device, and measuring a received current. The PDU/PSE (or the second connector/external power supply component) may be configured so that if a predetermined resistance/capacitance value is measured between the transmit and the receive power wire pairs, then the further powered device is determined to be a valid powered device to which the external power supply component is to supply a voltage.

The voltage supplied to a said valid powered device can be a fixed value set by the second DC to DC converter. Alternatively, the voltage supplied to a said valid powered device can be set by a user, e.g. via a control in the PDU/PSE. Alternatively, the voltage supplied to a said valid powered device can be based on a value provided by a variable voltage sensing module (e.g. included in the connector device/display device or the PDU/PSE).

The valid powered device may support power classification and can apply a load to indicate to the PDU/PSE (or the external power supply component) its power classification. The power classification may be based on IEEE 802.3af or IEEE 802.3at standards.

The PDU/PSE (or the second connector/external power supply component) can be configured to check for presence of a said further powered device at regular intervals. If a said further powered device is found to be removed then the PDU/PSE (or the second connector/external power supply component) can cease supplying the voltage.

As power usage of devices is driven down then the first powered device/display device and the at least one further powered device could be powered by a said power wire pair. Another device, e.g. a printer with low power requirement, could be powered by another power wire pair.

The connector device/display device may comprise a housing and the external power supply component may comprise at least one connector in the housing, e.g. on a rear surface of the display. The connector in the housing may, in use, connect the at least one further powered device to the at least one other power wire pair.

The connector in the housing can power first and second said further powered devices via a PDU port/Ethernet cable by utilising power class4 for each said powered device. The connector in the housing can power the first powered device using PoE mode A (pins 1, 2, 3, 6) and power the second powered device using Mode B (pins 4, 5, 7, 8).

In another embodiment, a said powered device can include at least one output power terminal and/or at least one internal power supply component (for powering a powered device internal to the powered device). Thus, the powered device (powered by the connector device/display device) can provide power to at least one further powered device. For example, two said powered devices connected to the external power supply component of the connector device/display device can each include two DC output power terminals to power two further powered devices, each of which can have a total peak power requirement under 25.5 W, meaning that a total of four powered devices are powered by 1 Ethernet cable.

As power usage of devices is driven down further then 4 devices could be separately run off each pair of Ethernet cores of 1 Ethernet cable. For example, the external power supply component may comprise three said connectors for, in use, connecting first, second and third said further powered devices.

Thus, whilst the technology industry in general is focused on trying to achieve higher power levels in PoE, the present inventor has taken a significantly different approach by using devices with low power requirements in combination with existing PoE technology so that more devices can be powered with less wires/cables.

In another aspect, the present invention provides a computing system comprising:
 a display device substantially as described herein, and
 a computing device connected to the external power supply component of the display device.

In yet another aspect, the present invention provides a system comprising at least one Power over Ethernet (PoE) connector device substantially as described herein and a PoE Power Distribution Unit (PDU).

The system may further comprise a power supply for the PoE PDU. The power supply may comprise a set of Lithium-Ion batteries. The PoE connector device(s), the power supply and the PoE PDU may be modular.

In yet another aspect, the present invention provides an image processing device comprising:
- an integrated connector for receiving at least one power wire pair of a power over Ethernet (PoE) cable to, in use, power the image processing device.

The image processing device may comprise a printer/scanner/fax/all-in-one device, or even a print server which then delivers data & power to multiple locally located devices.

Such image processing devices can be placed in remote locations without AC Power and only require a network cable to operate. This can make the devices more lightweight, cheaper to manufacture, less parts to manufacture (so better for the environment/recycling), reduced power loss, and improved flexibility in terms of positioning, etc.

Other aspects of the invention provide a PoE Power Distribution Unit, or Power Sourcing Equipment substantially as described herein.

Other aspects may provide a kit comprising PoE connector device substantially as described herein and at least one said PoE cable.

According to the present invention there is provided an apparatus and method as set forth in the appended claims. Other features of the invention will be apparent from the dependent claims, and the description which follows.

BRIEF INTRODUCTION TO THE FIGURES

For a better understanding of the invention, and to show how embodiments of the same may be carried into effect, reference will now be made, by way of example, to the accompanying diagrammatic drawings in which.

DESCRIPTION OF EXAMPLE EMBODIMENTS

Figure 1:
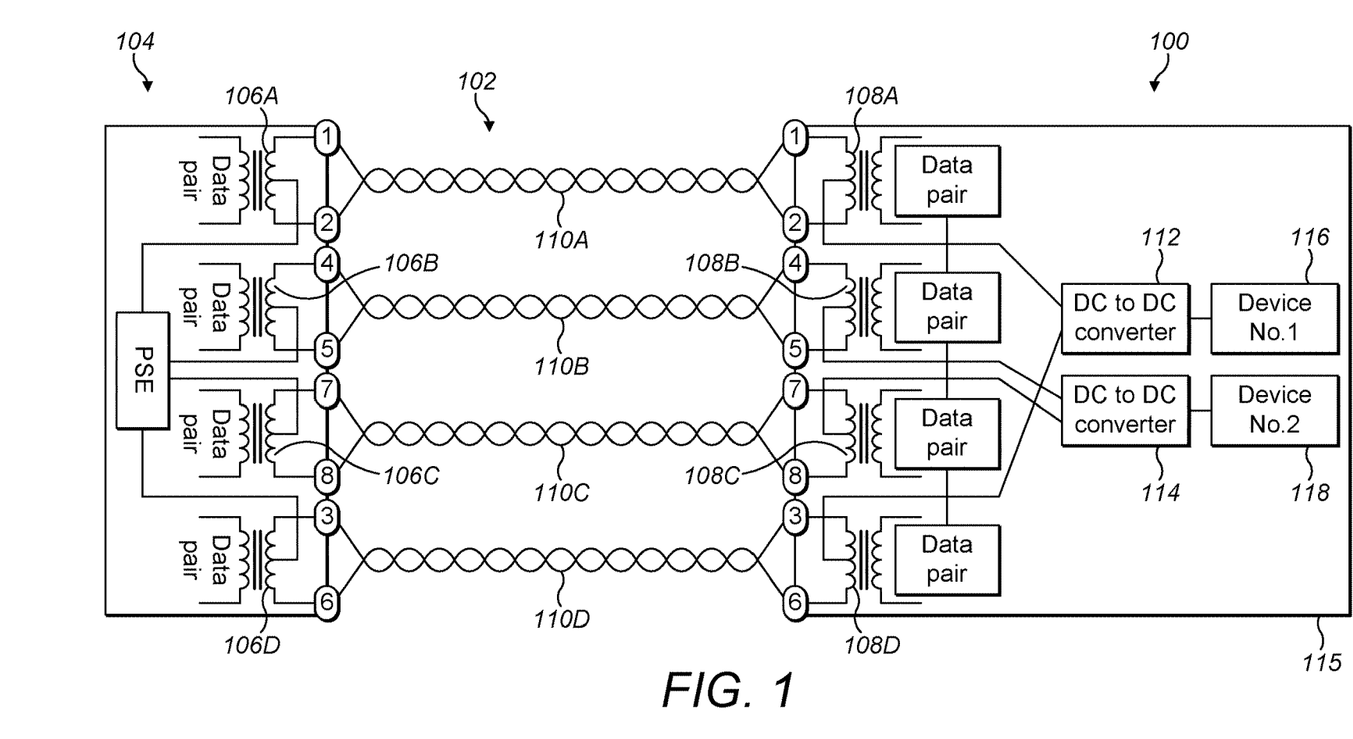
FIG. 1 shows an example Power over Ethernet (PoE) connector device connected to a power distribution unit.

Example embodiments of the present invention will be described in detail with reference to the accompanying drawings. Referring first to FIG. 1 there is shown an example PoE connector device 100 that is connected, via a network cable 102, to a power distribution unit (PDU) 104. The cable can comprise any suitable Ethernet cable cat5e and above, such as 24 AWG (American Wire Gauge).

The PDU 104 receives power, typically from a DC power supply such as a Power storage unit/batteries (not shown), which is distributed to power/data ports via four internal transformers 106A-106D. The secondary coil of each of these transformers is fitted with a pair of pins, which are conventionally numbered 1, 2; 4, 5; 7, 8; 3, 6.

The connector device 100 also includes a set of four internal transformers 108A-108D. Each of these transformers is also fitted with a pair of pins, conventionally numbered 1, 2; 4, 5; 7, 8; 3, 6.

The network cable 102 comprises four twisted pairs 110A-110D. The ends of the twisted pairs are connected to pin pairs 1, 2; 4, 5; 7, 8; 3, 6 of the PDU 104 and corresponding pin pairs 1, 2; 4, 5; 7, 8; 3, 6 of the connector device 100. Category 5e cable uses 24 AWG conductors, which can safely carry 360 mA at 50 V according to a current Telecommunications Industry Association (TIA) ruling. The cable has eight conductors and therefore the absolute maximum power transmitted using direct current over all 4 pairs can be 50 V×0.360 A×4=72 W. Considering the voltage drop after 100 m, a powered device (PD) would be only able to receive 59 W. The additional heat generated in the wires by PoE at this current level limits the total number of cables in a bundle to be 100 at 45° C. according to the TIA. Whilst the electronics industry in general is looking to maximise power to one powered device over an Ethernet cable, embodiments of the present invention can advantageously reduce power requirements by utilising energy efficient devices.

Embodiments of the connector device 100 can use all 8 conductors of the Ethernet cable (4 twisted pairs), allowing deployment of several low powered devices simply and cost effectively. Embodiments of the connector device can be capable of supplying 2×2 pairs, or 4 pairs' worth, of power, depending on the power requirements of the end points. A communication handshake will determine the power requirement and transmit route(s) whilst supporting existing IEEE802.3af/at standards.

The example connector device 100 further includes internal first 112 and second 114 DC to DC converters. The first converter is connected to pins 1, 2 and pins 3, 6 of the transformers 108A, 108D and can provide power and data to a first powered device 116. In some embodiments, the connector device may be integrated within, or fixed to, the first powered device and so the first converter can be considered to be an internal power supply component for that device. For example, the connector device can comprise a box-shaped housing 115 that can be fixed to (or formed as part of) a rear surface of a display device in a position adjacent where other/conventional cables are connected to the display device. Alternatively, the first powered device could comprise a printer or the like. A benefit of installing the connector device within the first powered device is that it will deliver better ventilation, cooling and shorter cable runs (some even direct connections on the PCB without DC cables) than in a small externally located metal/plastic box, all of which will minimise DC losses and therefore further improve overall electrical efficiency.

The second DC to DC converter 114 is connected to pins 4, 5 and pins 7, 8 of the transformers 108B, 108C and can provide power to a second powered device 118. In cases where the first converter functions as an internal power supply, the second powered device will be a separate device and so the second converter can be considered to be part of an external power supply. The second powered device may comprise a desktop computer (e.g. 19V), a printer/scanner/all-in-one/print-server or a phone, for example, and can be considered to be a peripheral device of the display device in cases where the first powered device 116 comprises a display device in which the connector device 100 is integrated. A suitable internal cable can directly connect the first converter 112 to the power circuitry of the display, whilst the second converter 114 may include a suitable connector, typically a standard DC jack-plug or terminal connector, to allow connection to the second powered device 118. In cases where the connector device comprises a separate connector component (rather than being integrated in a display device) both the first and the second DC converters can include suitable connectors for separate powered devices.

The connector device 100 can use the alternative mode A power transfer method in order to supply power and data to the first 116 powered device and simultaneously use the alternative mode B power transfer method to supply to power and data to the second 118 powered device (or vice versa in alternative embodiments). The example embodiment uses a specially designed connector device (which can be internally or externally mounted) that can power 2 PD's from 1×PDU port/Ethernet cable by utilising PD power class4 (power classes defined below) for each powered device, with the first set to use Mode A (pins 1, 2, 3, 6) and the second configured to use Mode B (pins 4, 5, 7, 8).

In another example the 2 PD's both have 2 DC output power terminals and each PD then powers 2 separate devices (internally or externally) with each having a total peak power requirement under 25.5 W and meaning 4 devices are now powered by 1 Ethernet cable.

Thus, the connector device can selectively provide individual power supplies up to 25.5 W to multiple powered devices from one Ethernet cable, which can simplify network cabling (reducing the cost by requiring less lines) and also use up less ports on a power sourcing device, such as a PoE switch or PDU, meaning more devices can be deployed with fewer required ports/units and improving energy efficiency and overall lower costs.

The first 112 and the second 114 DC converters can be configured to supply different voltages to the first 116 and second 118 powered devices. The PDU 104 can detect a powered device by applying a DC voltage between the transmit and receive wire pairs, and measuring the received current. If a resistance of 25 k Ohm and 150 nF capacitance is measured between the transmit and receive wire pairs, then the device is considered a valid PoE PD and power will be granted. It will be appreciated that these measured values may vary according to changing standards, etc. The voltage supplied can be set via a fixed DC to DC converter, or it can manually be set in the PDU on an adjustable variable DC-DC converter, or in another application it can make use of a variable voltage sensing module that will deliver the required voltage to the end powered device so that no manual setting/intervention is required and devices are protected from being plugged into an incorrect DC-DC converted voltage supply and potentially being permanently damaged or having internal fuses blown requiring costly engineer and/or manufacturer rectification.

After the powered device powers up, it will be classified into a power category. If the powered device supports optional power classification it will apply a load to the line to indicate to the PDU 104 the power classification it requires. If this is not done, the default class 0 is used. It will be understood that in alternative embodiments, at least some of the power management function described herein as being performed by the PDU 104 may be performed by a processor or other suitable device(s) in the connector device 100.

In a full IEEE802.3af/at compliant solution (active) the PDU/PSE 104 will check for the presence of PD's on connected ports at regular intervals, so power is removed when a PD is no longer connected. Legacy (pre-IEEE 802.3af Power Ethernet standard) PDs are also detected by the PDU/PSE by default. As PDs may require differing power ranges, the IEEE 802.3af and IEEE 802.3at Power Ethernet standards classify PDs according to their power consumption. By providing the PDU/PSE 104 with its power range, the PD allows the PDU/PSE to supply power with greater efficiency.

The power classes as outlined by IEEE 802.3af and IEEE 802.3at are as follows:

| PD Class | Power Available at PD | Power Supplied from PDU |
|---|---|---|
| 0 | 0.44 W to 12.95 W | 15.4 W |
| 1 | 0.44 W to 3.84 W | 4.0 W |
| 2 | 3.84 W to 6.49 W | 7.0 W |
| 3 | 6.49 W to 12.95 W | 15.4 W |
| 4 | 12.95 W to 25.5 W | 30 W |

The illustrated connector device 100 can provide fully compliant detection, disconnect and voltage control in accordance with IEEE802.3af and/or IEEE802.3at; single source 4 pair power current sharing; full protection open circuit, over voltage protection and can be gigabit compatible, or it can provide a forced power non-compliant version utilising passive POE It will be appreciated that alternative embodiments of the connector device 100 can be provided to supply power and data to different numbers and configurations of powered devices. For example, a connector device capable of receiving two Ethernet cables (a total of eight twisted pairs) could selectively provide power to up to potentially over eight powered devices.

Figure 2:
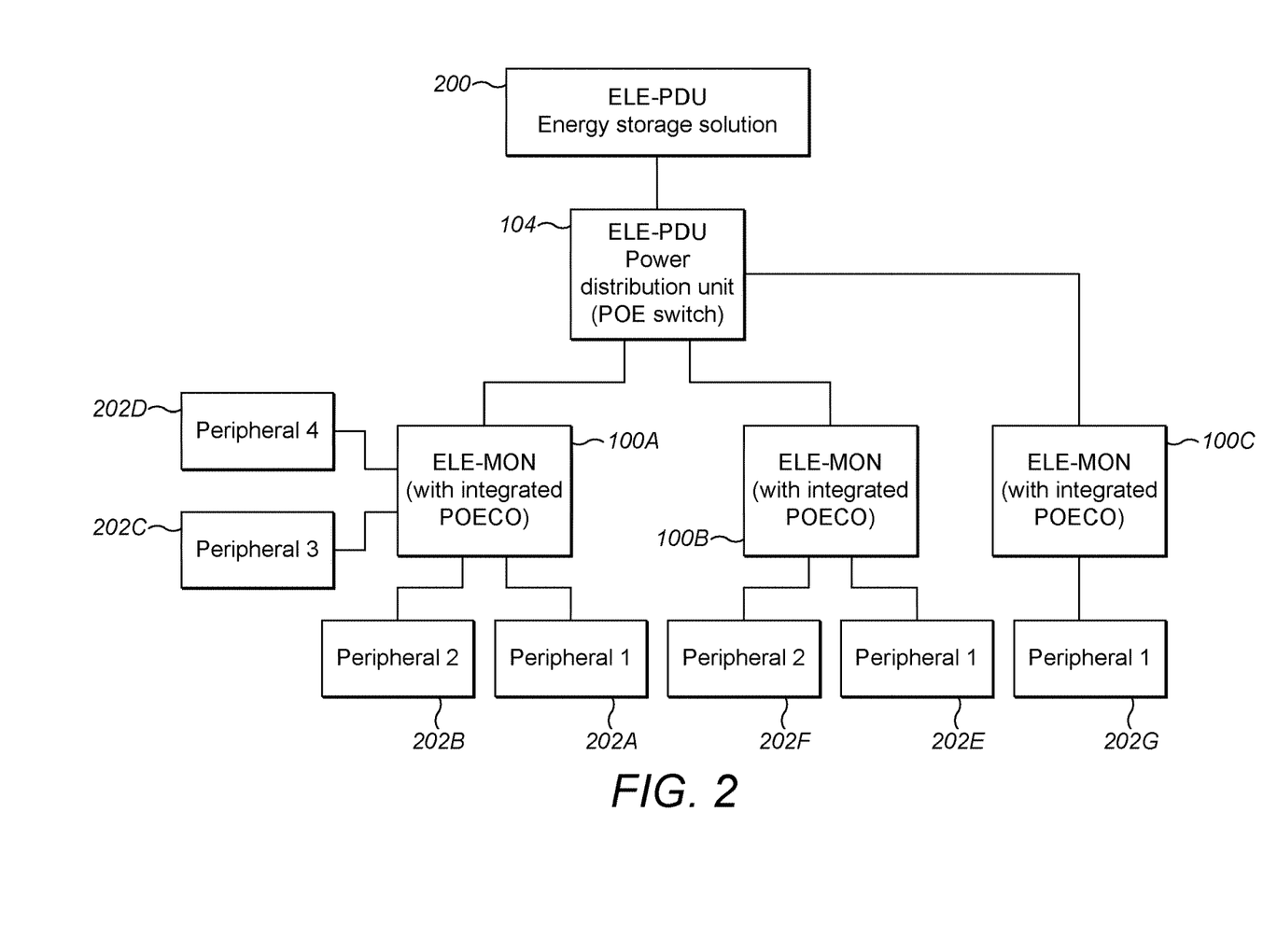
FIG. 2 shows an example of how a plurality of display units including respective PoE connector devices can be connected to a power supply via a power distribution unit.

FIG. 2 shows an example topology where three connector devices 100A-100C are connected to a PDU 104. It will be appreciated that the number, arrangement and types of devices shown are exemplary only and many variations are possible. The PDU receives power from a supply 200. A set of four powered devices 202A-202D are connected to the first connector device 100A, two powered devices 200E-200F connected to the second 100B, and one powered device 200G to the third connector device 100C. The power supply can implement the alternative mode A and/or alternative mode B power transfer methods, while remaining compliant with the PoE standard. The powered devices should support both modes because the connector devices make use of both methods of power transmission.

In some embodiments, the power supply 200 comprises a battery device, although it will be appreciated that supplies using mains, renewably-generated (e.g. solar) and/or battery-based power could be used. In one embodiment the power supply comprises a 5 kW High-Power Lithium-Ion Phosphate Storage and Battery Management System. The supply may be a modular, 4U rack-mounted, intelligent battery system that incorporates a large number of low voltage Lithium-Ion batteries, which offer superior power charging and throughput capabilities and with the load spread across many cells rather than one or two. The system can also provide redundancy in the event of a battery unit failure. Heat dissipation can also be mitigated, meaning that no power is wasted on cooling systems.

Lithium-ion batteries are generally much lighter than other types of rechargeable batteries of the same size. Lithium is also a highly reactive element, meaning that a lot of energy can be stored within its atomic bonds, which, in turn, translates into a very high energy density. For their size or weight, lithium-ion cells can store more energy than any other rechargeable batteries which is a critical consideration for transportation and installation, especially in remote locations. Using lithium-ion also offers wider operational temperature bands with a range of −20 centigrade to +55 centigrade. In these kinds of environments, these non-toxic lithium fuel cells offer better performance than any other rechargeable batteries, as well as being less damaging to the environment both in terms of their manufacturing processes and their disposal. It will be appreciated that in alternative embodiments a fuel cell energy storage solution may be employed, according to economic and technical considerations that may be relevant to such alternatives and their intended functionality.

The specifications of one version of the power supply 200 include: nominal voltage 48V; nominal capacity 4.6-4.8 kW; voltage range 37.5V to 54.8V; charge method constant charge/constant voltage; maximum discharge current/peak current 50 A continuous/70 A peak; maximum charge current 50 A continuous; charge time @80%/85% DOD around 10 hours at 10 A; maximum output power 2500 W.

The PDU 104 can deliver the required high power and gigabit network traffic over CAT5E/CAT6 Ethernet cables. By utilising IT Network infrastructure it is possible to build a DC smart grid style system and ensure that exactly the correct power is delivered to each port (up to a distance of 100 m in some embodiments) with the power being delivered/used as and when it is required. The PDU has no fans or moving parts and therefore has a very low power draw itself with a standby usage of <1 Watt. The unit can be wall mounted or hung vertically in a rack. In some cases there are 12×PDU's in a single row giving a potential 96 power distribution ports per 4U slot, which also helps keep the footprint small. The intelligent PDU system can be entirely modular and scalable, offering robust and dependable performance even in harsh environments.

The specifications of one version of the PDU 104 include: input voltage 46-55 VDC; connection 1 removable 4-contact terminal block; reverse polarity protection; PoE power output supports up to 50 W per PoE port; power consumption <1 W on standby; architecture back-plane (switching fabric): 5.6 Gbps; packet through ability (full-duplex): 1.488 Mpps@64 bytes; transfer rate 14,880 pps for Ethernet port; 148,800 pps for Fast Ethernet Port; MAC table size 8K; housing: metal, IP30 protection; standards: IEEE 802.3 10 BaseT Ethernet, IEEE 802.3u 100 Base Tx Fast Ethernet; flow control: IEEE 802.3x flow control, back pressure flow control; RJ45 Ports: 10/100/1000 BaseT(x)auto negotiation speed, full/half duplex mode and auto MDI/MDI-X connection 8*10/100/1000 Tx(PoE+). As well as all the specifications listed above the PDU can either be a full IEEE802.3af, IEEE802.3at, IEEE802.3bt (when the standard is released/published in 2015), or it can be a non-compliant Passive PDU unit utilising forced power and therefore not delivering the full power detection, connection or disconnect functions.

In the example topology of FIG. 2, the PDU 104 is shown connected to three connector devices 100A-100C. Each of these devices may comprise a display unit with an integrated connector device, or they may comprise stand-alone connectors. In some embodiments the display device includes no standard power supply and instead draws current via an integrated 48V connector device. This results in a lighter, more environmentally friendly screen that consumes only 10-15 watts of electricity in standard operational mode and less than 0.5 watts in standby.

The specifications of one embodiment of the powered display device 100 include: 48V POE receiver or DC 12V Integrated Power Supply; Power Consumption: 10.0-15.0 Watt operational (depending on brightness), 45 mW standby, sleep 35 mW; 12V DC Output voltage, 48V-56V Input voltage, 50 W Port Power Output. The device may include 2× RJ45 Connector 10/100/1000M copper cable ports, support a speed of 10/100/1000 Mbps and IEEE 802.3i 10 BASET, IEEE 802.3u 100 BASETX, IEEE 802.3x Flow Control, as well as IEEE 802.1af, PoE++ high power, IEEE802.3af & IEEE802.3at standards. The power supply can include four line pairs of twisted pair, the positive power supply side being on line pairs 1/2 or 4/5 and the negative power supply side on line pairs 3/6 or 7/8.

The powered devices 202A-202G can comprise any suitable PoE-enabled devices, e.g. low power requirement desktop computers, printers, scanners, etc.

Figure 3:
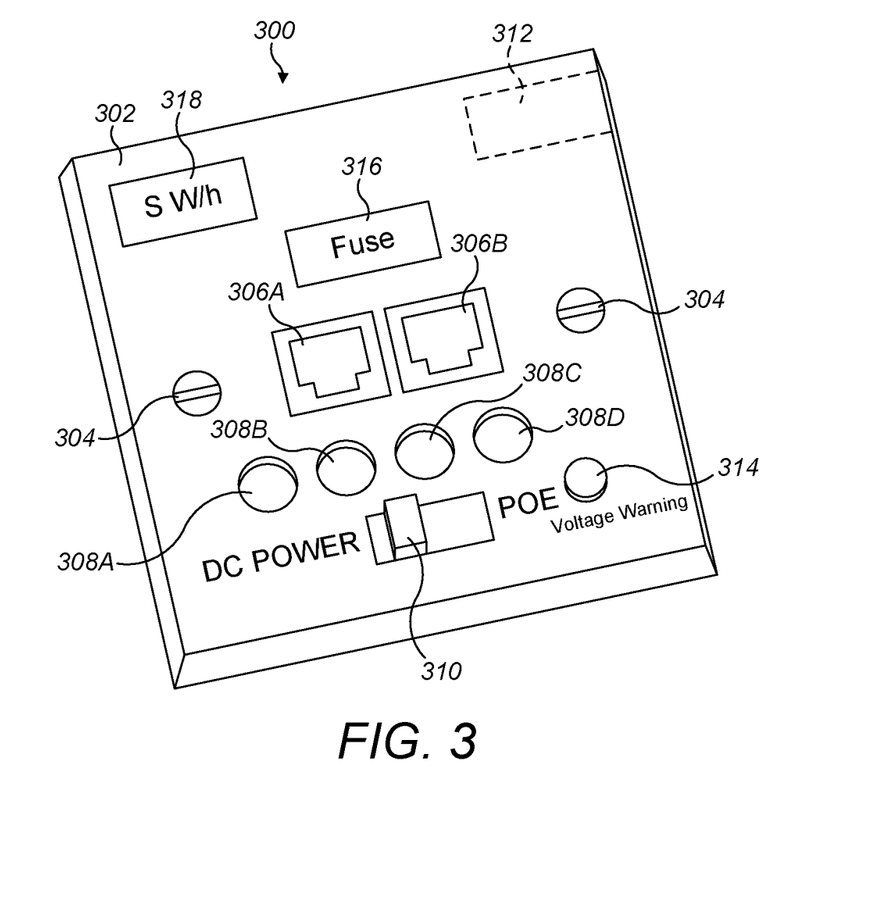
FIG. 3 shows an embodiment where the PoE connector device is in the form of a wall-mounted socket.

FIG. 3 illustrates an alternative embodiment where the PoE connector device is built into a wall socket/wall connector device 300.

The example connector device 300 includes a housing 302, which can be formed of any suitable material(s), e.g. plastic, and have any suitable dimensions. In the illustrated example, the housing is square in shape and is similar in form and dimensions to known wall-mounted sockets used for telephone sockets, data cable sockets, etc. The housing can be mounted on a wall using screws 304 or any other suitable means.

The example connector device 300 can include one or more PoE socket, e.g. RJ-45. The PoE sockets may be configured to use, for example, all 8 conductors of an Ethernet cable (4 twisted pairs), allowing deployment of several low powered devices simply and cost effectively in a manner similar to the embodiments described above. In the illustrated example, a first one 306A of the PoE sockets can act as a first connector for, in use, connecting a first set comprising at least one power wire pair of a PoE cable to a first powered device (not shown). The second PoE socket 306B can act as a second connector for, in use, connecting a second set comprising at least one other power wire pair of the PoE cable to at least one further powered device (not shown). In the illustrated example there are two RJ-45 sockets 306A, 306B positioned side-by-side, although it will be understood that the number (e.g. 4 in alternative embodiments) and arrangement of these sockets can vary.

The example connector device 300 may further include at least one DC power outlet to deliver power to one or more screen, PC, etc. In the illustrated example there are four DC jack plugs 308A-308D, although, again, although it will be understood that the number and arrangement of these can vary. The DC power outlets can have a fixed DC voltage output at 5/9/12/24/48 v, for example, or the connector device 300 could include a switched output to vary the voltage of some/all of the sockets/outlets. The wall socket connector device 300 may auto-detect the required voltage of a connected device(s), and output the required voltage at each DC power output.

Alternative embodiments of the connector device 300 can include any proprietary power connector, such a JST connector, instead of a DC jack plug in order to avoid people plugging in normal DC jack plugs. Alternatively or additionally, the connector device 300 can include one or more USB connectors (now shown) for various power and charging solutions.

The example connector device 300 can have a switch 310 to turn off the DC power outlets 308 and only send the data/power out through the PoE sockets 306 to enable a true POE device to be connected. In the other position, the switch can turn off data and PoE power supplied devices. Although a conventional switch is shown, it will be appreciated that the switching function can be provided by other means, e.g. separate controls/buttons or even remote control (by a dedicated remote controller device or by means of code executing on a processor of a connected device, for instance).

The connector device 300 may include an internal power supply (shown schematically at 312), or may be connected to an external power source. Embodiments may also/alternatively be powered by Ethernet cables, e.g. 16 power cores (2×8 pairs of cables), for supplying further DC power outlets, or for combining power to deliver higher amperage/amps to certain devices. Embodiments of the connector 300 may have in-built battery storage to be trickle charged via PoE to deliver higher power for shorter intervals via the DC outlets, or to provide a startup current for devices with a high startup threshold but lower operating values. This could be used, for example, in a hotel/office/school scenario and enable electronic devices on a desk area (e.g. TV, phone, LAN device, etc) to powered only by the DC PoE wall socket and no AC plugs.

Embodiments of the connector device 300 can comprise a multiple socket configuration and may include a wall mounted, free standing or desk mounted multi adapter socket that is connected to multiple Ethernet cables for power and data. Embodiments of the connector device can incorporate a DC to AC inverter in order to provide, for instance, AC 110V or 220V electricity for devices that cannot be run directly off DC power. The connector device in socket form can have a single AC power outlet or multiple AC power outlets, as well as (or instead of) DC power outlets.

For embodiments of the connector device 300 to power an AC powered appliance, it can take power directly from a large number of paired cores via multiple Ethernet cables, or alternatively trickle charge a KW amount of energy storage in the socket via a much lower number of paired cores at unused or low periods of usage. This energy efficient setup can equate in some instances to over a 1:6 ratio saving for required Ethernet cables and cores needed for real time AC power versus locally stored and delivered power. Such embodiments can be used to power a wide variety of appliances (e.g. vacuum cleaners, etc) that with higher power requirements than computer-related devices.

The connector device 300 can have a warning device 314 to show when the power levels of the connected devices are approaching its upper power limit. In the illustrated example the warning device comprises a light, but it will be understood that alternative and/or additional warnings may be used, e.g. an audible alarm and/or a warning message on a (local or remote) display. The connector device 300 may be protected by being configured to cut out when a total upper limit has been reached across all or some of its connectors/outlets. The connector device 300 can include a fuse 316 for further protection.

The connector device 300 may also include a power display on it to show the electricity being used in real time for each of the DC outlets 308. In some embodiments, the power display may alternatively or additionally show information relating to power use of a device connected to one or more of the PoE sockets 306. This display may comprise an LCD/LED screen and cable extension on the fascia of the connector device, or the power display 318 may be located the on the front face of the wall socket. In other embodiments the power display may be located on the front or rear of the display device 100, or the PC or peripheral device 202.

The power display may include/be connected to an electronic meter device controlled by high performance microprocessors and precise resistors to measure power (W), current (A) and voltage (V) at the current time. In some embodiments it may meter carbon footprint, total energy used (W/h) and battery/storage charge (A/h)—for off-grid or energy storage applications. The energy storage embodiment may incorporate the use of an additional shunt device to measure the storage capacity for different battery mediums.

This power display may display an aggregated set of results for all of the electronic devices connected to the connector device 300, or it can display individual DC connections/device details. The power display can include a USB or plug-in memory card, which can be inserted to capture the data logged over a period of time for more detailed historical analysis.

The incorporation of the power display device can help raise awareness regarding the amount of DC power connected devices actually consume and can help towards an overall energy management initiative. It will also give consumers real and true appliance electricity runtime/cost data and enable them to become more conscious and aware of power demand of various DC powered electronic devices.

Embodiments of the wall-mounted connector device 300 may, alternatively or additionally, include features/components of the other embodiments described herein and/or be connected to further components in a similar manner to the other embodiments described herein. Furthermore, the other embodiments of FIGS. 1 and 2 can include features/components of the wall-mounted connector device 300.

Figure 4:
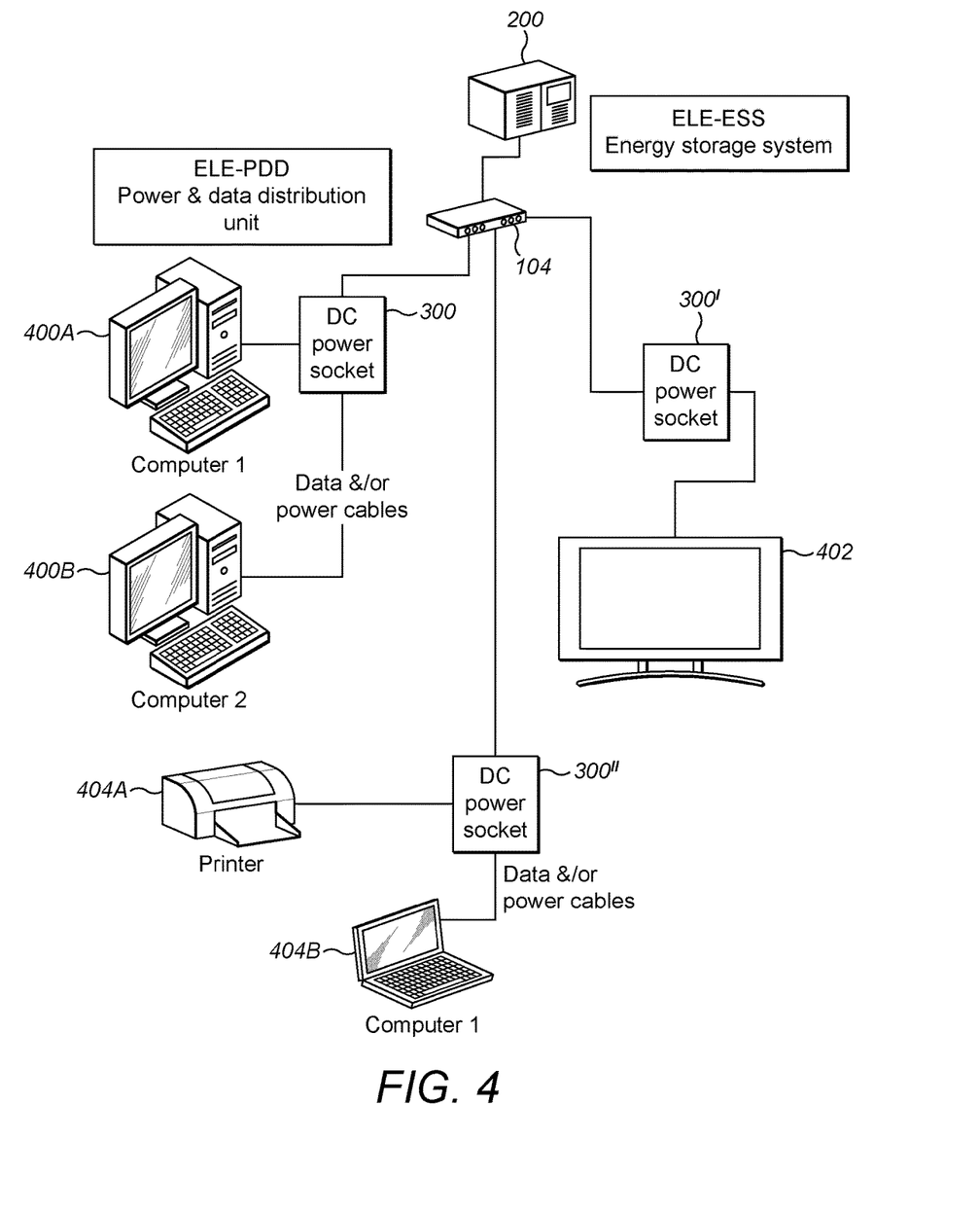
FIG. 4 is an example topology diagram illustrating embodiments of the wall-mounted socket connector device in use.

FIG. 4 is a topology diagram illustrating how embodiments of the wall-mounted connector device 300 can be used. In the example arrangement, a power supply 200 is connected to a PDU 104. These correspond to the components shown in FIG. 2, but could vary. The PDU is connected via cables to three wall-mounted connector devices 300, 300', 300". The first connector device 300 is connected to first 400A and second 400B PCs. The second connector device 300' is connected to one low power display device 402. The third connector device 300" is connected to a printer 404A and a laptop computer 404B. The skilled person will appreciate that many variations of this arrangement, including different numbers, types and communication relationships between the various components, will be possible.

In some embodiments, a computing device may be provided with a software reporting package that allows remote, real-time monitoring of appliance power consumption, generation, storage and capacity of the connected devices. As well as providing real-time usage data, the software can also monitor system health and provide advance warning of system or fuel cell malfunctions. The software may comprise a web-based tool affords access to full reporting from a local PC or any web enabled device. The software may also remotely trigger on-site relay switches to operate AC backup charging or backup fuel cell systems to avoid any system power outages on-site.

Embodiments of the PoE connector can use multiple pairs to distribute power, as mentioned above, for load balancing, efficiency, less heat output, less data packet loss with higher power transmission and less overall power wastage.

The present invention will be understood readily by reference to the above description of example embodiments and the accompanying drawings. The present invention may, however, be embodied in many different forms and should not be construed as being limited to the example embodiments described above. Rather, these embodiments are provided so that this disclosure will be thorough and complete and will fully convey the concept of the invention to those skilled in the art. The present invention is defined by the statements of aspects of the invention in the summary of invention section above, and with reference to any appended claims.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification, including any accompanying claims, abstract and drawings, and/or all of the steps of any method or process so disclosed, may be combined in any combination, except combinations where at least some of such features and/or steps are mutually exclusive.

Each feature disclosed in this specification, including any accompanying claims, abstract and drawings, may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification, including any accompanying claims, abstract and drawings, or to any novel one, or any novel combination, of the steps of any method or process so disclosed.

The invention claimed is:

1. A Power over Ethernet, PoE, connector device comprising:
   a first connector connectable to a first set comprising at least one power wire pair of a PoE cable to a first powered device;
   a second connector connectable to a second set comprising at least one other power wire pair of the PoE cable to at least one further powered device; and
   a housing;
   wherein the at least one further powered device is electrically isolated from the first powered device; and
   wherein the first connector includes a first DC to DC converter in the housing and the second connector includes a second DC to DC converter in the housing.

2. A connector device according to claim 1, wherein the first connector uses two said power wire pairs of the PoE cable and the second connector uses two other said power wire pairs of the PoE cable utilizing PoE mode A and mode B simultaneously.

3. A connector device according to claim 1, wherein the first connector or the second connector uses alternative mode A PoE power transfer method, and the second connector or the first connector simultaneously uses alternative mode B PoE power transfer method.

4. A connector device according to claim 1, wherein each of the first and the second DC to DC converter is configurable to provide selectable and differing power levels.

5. A connector device according to claim 4, wherein the connector apparatus is connected to a PoE Power Distribution Unit, PDU, or Power Sourcing Equipment, PSE, and wherein the PDU/PSE, or the external power supply component, is configured to detect a valid said further powered device connected to the second connector by applying a DC voltage between transmit and receive said power wire pairs connectable to the further powered device, and measuring a received current, and wherein the PDU/PSE, or the second connector, is configured so that if a predetermined resistance/capacitance value is measured between the transmit and the receive power wire pairs, then the further powered device is determined to be a valid powered device to which the second connector is to supply a voltage.

6. A connector device according to claim 5, wherein the voltage supplied to a said valid powered device is based on a fixed value set by the second DC to DC converter, or wherein the voltage supplied to a said valid powered device is set by a user, or wherein the voltage supplied to a said valid powered device is based on a value provided by a variable voltage sensing module included in the connector device or the PDU/PSE, or wherein the valid powered device applies a load to indicate its power classification/required voltage to the PDU/PSE, or to the second connector, or wherein the PDU/PSE, or the second connector, is configured to check for presence of a said valid powered device at regular intervals.

7. A connector device according to claim 1, wherein the second connector is connectable to the at least one further powered device to connect the at least one further powered device to the at least one other power wire pair, and wherein the connector in the housing, in use, powers first and second said further powered devices via the PoE cable by utilizing power class4 for each said further powered device, and wherein the connector in the housing, in use, powers the first further powered device using PoE mode A and powers the second powered device using Mode B.

8. A connector device according to claim 1, wherein a said further powered device includes at least one output power terminal, and wherein the further powered device provides power to at least one further powered device via the at least one output power terminal, and wherein said further powered devices connected to the second connector of the connector apparatus each include two DC output power terminals.

9. A connector device according to claim 1, wherein the connector device is included in a display device, and wherein the first connector is arranged to use the at least one power wire pair to power the display device, and the second connector is arranged to use the at least one other power wire pair to, in use, supply power to the at least one further powered device, and wherein the display device, in use, comprises an LED screen.

10. A connector device according to claim 1, wherein the connector device is built into a wall-mounted socket (300), and wherein the connector device further includes at least one DC power outlet (308).

11. A connector device according to claim 10, wherein the connector device includes a switched output to vary voltage output of the first connector, the second connector and/or the at least one DC power outlet, and wherein the connector device auto-detects a voltage requirement of a connected said powered device.

12. A connector device according to claim 11, further including a switch to switch the at least one DC power outlet on/off, and to switch the first connector and the second connector off/on.

13. A connector device according to claim 12, further including an internal power supply including an in-built battery storage to be trickle charged via PoE.

14. A connector device according to claim 13, further including a warning device to warn when a power level of at least one of the connected devices is approaching an upper power limit, and wherein the connector device is configured to cut out when the upper power limit has, in use, been reached across all or some of the first connector, the second connector and/or the at least one DC power outlet.

15. A connector device according to claim 13, further including at least one DC to AC inverter and at least one corresponding AC power outlet, wherein the DC to AC inverter obtains power from a plurality of paired cores via a plurality of Ethernet cables, and wherein the connector device charges an energy store via a plurality of paired cores at unused/low usage periods to provide power to the DC to AC inverter.

* * * * *